C. J. HOGEBOOM.
POWER PLANT FOR AUTOTRUCKS AND THE LIKE.
APPLICATION FILED MAR. 2, 1917.
1,268,119.
Patented June 4, 1918.
2 SHEETS—SHEET 2.
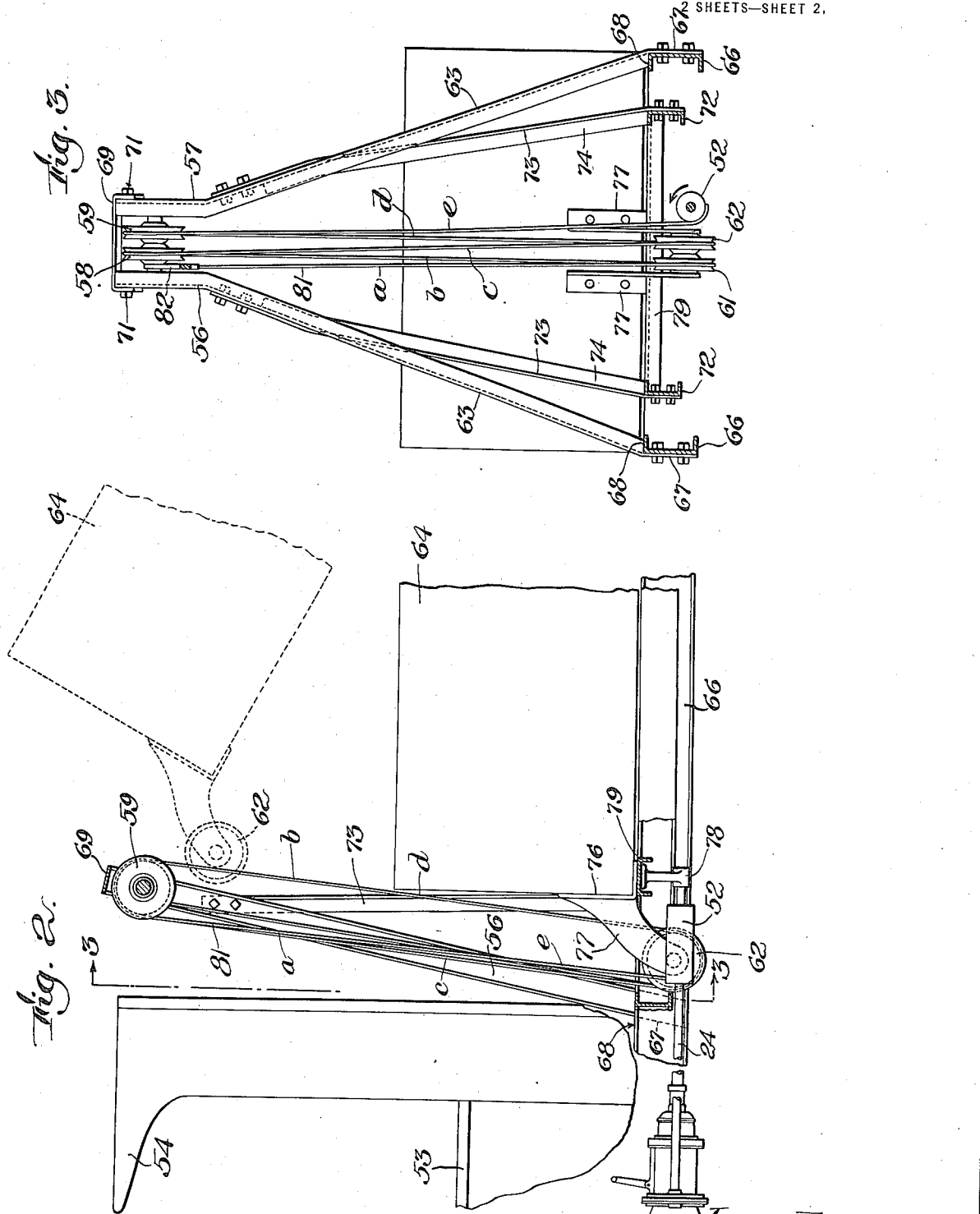
Inventor:
Clarence J. Hogeboom,
by Rohrte Rohrte Cushman
His Attorneys.

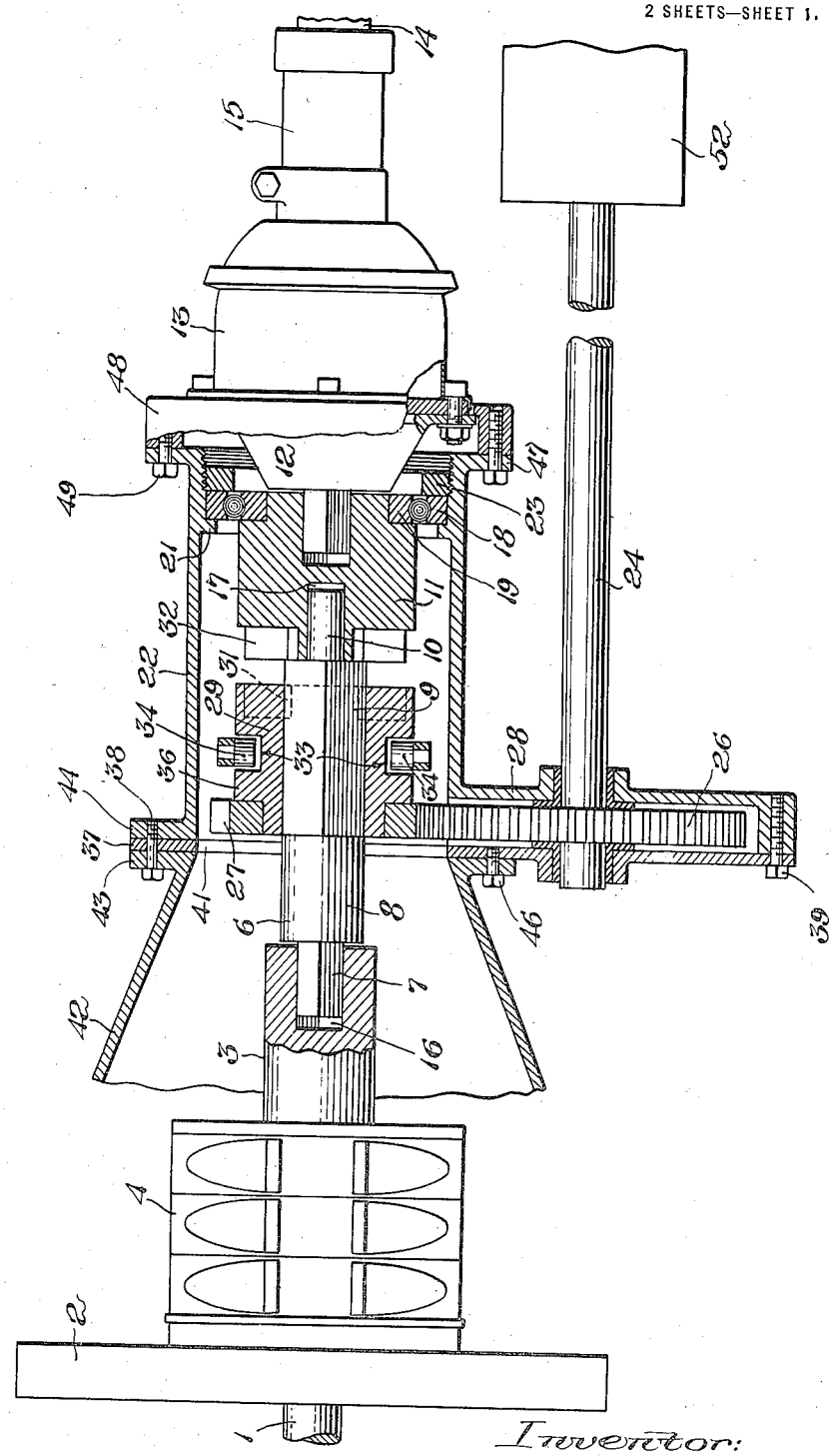

UNITED STATES PATENT OFFICE.

CLARENCE J. HOGEBOOM, OF BOSTON, MASSACHUSETTS, ASSIGNOR TO SAMUEL W. PRUSSIAN, OF BROOKLINE, MASSACHUSETTS.

POWER PLANT FOR AUTOTRUCKS AND THE LIKE.

1,268,119.

Specification of Letters Patent.   Patented June 4, 1918.

Application filed March 2, 1917.  Serial No. 151,955.

*To all whom it may concern:*

Be it known that I, CLARENCE J. HOGEBOOM, a citizen of the United States, and resident of Boston, in the county of Suffolk and State of Massachusetts, have invented new and useful Improvements in Power Plants for Autotrucks and the like, of which the following is a specification.

This invention relates to a power-plant and transmission system and more particularly to a transmission system especially adapted for use in automobile trucks. In the particular application of the invention herein employed for the purpose of illustration the system is shown as embodied in an auto-truck of the mechanical-dump type, wherein the mechanism for raising one end of the box-like bed of the truck is arranged to be operated by the truck-propelling engine, although the invention is adapted to be employed for operating auxiliary apparatus other than dumping mechanism and indeed the invention in many of its aspects is adapted to be employed independently of any auxiliary apparatus.

In auto-trucks heretofore provided with auxiliary apparatus arranged to be driven by the truck engine, either while the truck is in motion or while the engine is disconnected from the propelling wheels, there has been employed change-speed gearing of the type in which sliding gears are arranged to engage coöperating gears of different diameters thereby affording means for varying the gear ratio and the relative velocity of propulsion. With change-speed gearing of this type auxiliary apparatus such as dumping mechanism may be readily connected and disconnected to and from the engine shaft by means of sliding gears associated with the change-speed gearing. Moreover, the clutch employed to disconnect the engine from the change-speed gearing in shifting the gears may also be employed to disconnect the engine while the auxiliary apparatus is being connected or disconnected to or from the main transmission shafting, the connection between the auxiliary apparatus and the main line of shafting being disposed on the side of the clutch opposite to the engine.

However, when employing change-speed gearing of the planetary or like type, it is impossible, owing to the inherent character of the change-speed gearing, to connect the auxiliary apparatus with the transmission shafting in such manner that the change-speed clutch mechanism can also be employed to disconnect the engine from the propelling wheels while the auxiliary apparatus is connected to the engine.

The principal object of my invention is to provide a transmission system adapted to be employed in combination with a power-plant having a planetary or like type of change-speed gearing so that auxiliary apparatus may be connected to the engine while the engine is disconnected from the propelling wheels. A corollarial object is to provide a power-plant having a planetary or like change-speed gearing in which the auxiliary apparatus is arranged to be connected to the engine on the side of the change-speed gearing opposite to the engine so that the velocity of the auxiliary apparatus may be regulated by means of the change-speed gearing.

Other objects of the invention are to provide novel and efficient hoisting mechanism for dump-trucks, to associate the hoisting mechanism with the main transmission line of an auto-truck in a simple and effective manner, to provide a sectional line of transmission shafting possessing both ruggedness and flexibility, and to correlate the various parts of the system in a simple and economical manner.

Still further objects of the invention will be apparent from the following description and accompanying drawings, in which—

Figure 1 is a horizontal longitudinal section through a portion of the transmission system, parts being shown in elevation;

Fig. 2 is a side elevation of a portion of the system showing its relation to the dump-truck, parts of the dump-truck being shown diagrammatically; and Fig. 3 is a vertical transverse section taken on line 3—3 of Fig. 2.

The main portion of the transmission system illustrated in the drawings comprises an engine shaft 1 carrying a fly-wheel 2; a transmission shaft 3 associated with the change-speed transmission gearing 4, herein illustrated as being of the planetary type; a relatively short shaft 6 having a square portion 7, a round section 8, another square section 9 and a round projection 10; a clutch member 11; and a coupling member 12 rigidly connected to one end of the universal joint 13, the other end of the universal joint being connected to the shaft 14 which may extend to the transverse shaft arranged to drive the propelling wheels.

The square projection 7 on the forward end of shaft 6 is adapted to fit into a square opening 16 in the end of transmission shaft 3 so that these two shafts may have some longitudinal movement and at the same time be constrained to rotate together. The round projection 10 of the rear end of shaft 6 is adapted slidingly to fit into a round recess 17 in the forward end of the clutch member 11, thus permitting the shaft 6 to move longitudinally and angularly with respect to the clutch member 11. The coupling member 12 and all mechanism disposed rearwardly thereof in the main transmission line, is preferably of the character disclosed in my copending application Sr. No. 146,590, filed Feb. 5, 1917, the member 12 corresponding to member 1 in the aforesaid application.

In order centrally to support the transmission shaft a ball bearing comprising outer and inner rings 18 and 19, respectively, are provided around the clutch member 11, the inner ring 19 being pressed on to the clutch member so as to be rigidly mounted thereon. The outer ring 18 is rigidly secured between the annular member 21 which is preferably formed integrally with the casing 22 and the member 23 which is threaded into the casing 22 so as to clamp the ring 18 in the position shown in Fig. 1. Thus, the clutch member 11 is substantially prevented from moving longitudinally of the line of shafting and it serves to support, through the medium of the ball bearing, the portions of the shafting disposed both rearwardly and forwardly thereof.

In order to transmit power from the main line of shafting to the housing mechanism an auxiliary shaft 24 is provided at one side of the main line of shafting, this shaft being arranged to be driven by means of a spur gear 26 adapted to mesh with a spur gear 27 mounted on the shaft 6, the shaft 24 being journaled at its forward end in a lateral extension 28 on the casing 22, this extension preferably being formed integrally with the casing 22. In order to connect and disconnect the auxiliary mechanism to and from the main transmission line, the gears 26 and 27 are arranged to be moved relatively to each other so as to be thrown into and out of engagement with each other. The preferred means for accomplishing this result which I have illustrated in Fig. 1 is comprised as follows:

Upon the square portion 9 of shaft 6 is provided a second clutch member 29, this clutch member having an inner cross-sectional contour such that it can slide freely longitudinally of the shaft 6 but so that it is at all times constrained to rotate with the shaft 6. Upon the forward end of the clutch member 29 is disposed the spur gear 27, this spur gear preferably being formed integrally with the clutch member 29 although it may, if desired, be formed separately and suitably secured to the clutch member as shown in Fig. 1. At the rear end of the clutch member are provided clutch segments 31 adapted to mesh with the clutch segments 32 on the forward end of the other clutch member 11. The clutch segments 31 ar preferably formed integrally with the clutch member 29 and in order to shift the clutch member along the shaft 6 a channel 33 is preferably provided between the clutch segments 31 and the spur gear 27. Suitable gear shifting mechanism may then be employed to shift the clutch member, spur gear 27 and clutch segments 31 along the shaft 6, ordinary shifting fingers adapted to be mounted on an ordinary shifting lever being shown at 34. These fingers extend into the channel 33 and are prevented from interfering with the spur gear 27 by means of a shoulder 36 of somewhat less diameter than that of the spur gear.

At the forward end of the casing 22 is preferably provided a transverse plate 37, this plate being secured to the housing 22 by means of bolts 38 and being secured to the extension 28 by means of bolts 39. The plate 37 has a circular opening 41 of substantially the same diameter as the inner diameter of the cylindrical portion of the housing 22, this opening being disposed concentrically with the housing 22 and the shaft extending therethrough. In order continuously to inclose the transmission apparatus, the engine or transmission casing 42, which may be of any standard type such as the Ford type, is preferably connected to the housing 22 through the medium of the plate 37, the bolts 38 extending through the flange 43 of the housing 42 throughout substantially the upper half (Fig. 1) of the circumference of the flanges 43 and 44 and the flange 43 being secured to the plate 37 by means of bolts 46 throughout the other half of its circumference. The rear end of the housing 22 is provided with a flange 47 and upon this flange is mounted an annular thrust bearing 48 by means of bolts 49, this thrust bearing preferably being similar to the corresponding member 39 in my prior application and preferably being associated with the coupling member in the same manner.

The hoisting mechanism adapted to be driven by the auxiliary shaft 24 through the medium of the drum 52 is preferably constructed and arranged as follows: Immediately in the rear of the driver's seat 53 and cab 54 are provided upright supports 56 and 57 carrying pulleys 58 and 59 at the upper end thereof, these pulleys being adapted to coöperate with pulleys 61 and 62 mounted at the forward lower end of the box or bed of the truck shown in outline at 64. The uprights 56 and 57, respectively, are preferably constructed of channel members 63 the flanges of which project inwardly. At the lower ends the flanges of the channel members are cut away so that the connecting ribs of the members may lap over and be secured to the outer longitudinal channel members 66, as shown at 67, the lower ends of the flanges resting on the upper surfaces 68 of members 66. In the plane of the upper surfaces 68 of channels 66 the members 63 are bent inwardly equal amounts so as to converge toward the upper pulleys 58 and 59. In a plane disposed just beneath the pulleys the members 63 are bent outwardly so that the upper ends are disposed in parallel vertical planes. The upper ends of the members 63 are preferably tied together and rigidly braced by means of a strap member 69 folded over the ends of member 63 and secured thereto by means of bolts 71. The pulleys 58 and 59 are journaled in the upper parallel portions of members 63 in any suitable manner.

Upon the inner longitudinal channel member 72 of the chassis are mounted braces 73, these braces preferably being in the form of angle irons. These angle irons 73 are preferably disposed substantially vertically in such manner as to meet the channel members 63 near their upper ends. The inwardly extending flanges 74 of the angle irons are cut off at both the top and bottom of the members 73 so that the outer flanges of the members 63 may be connected to the members 63 at their upper ends and to the members 72 at their lower ends. As shown in Fig. 3 the members 73 are preferably bent inwardly near their upper ends so as to fit over and extend in parallelism with the members 63.

The means for mounting the pulleys 61 and 62 on the lower portion of the forward end of the box or bed 64 of the truck preferably consists of the integral casting 76, which comprises an angular portion fitting around the bed 64 and rib portions 77, extending downwardly and forwardly on opposite sides of the pulleys, in which the pulleys are journaled about a transverse horizontal axis. The upright supports 63 are inclined rearwardly a sufficient amount to support the upper pulleys 58 and 59 substantially above the pulleys 61 and 62. The rear end of the drum-shaft 24 is journaled in a bearing 78 mounted on the under surface of the channel member 79, the latter extending transversely of the chassis and being mounted at its opposite ends on the longitudinal channel members 72. The drum 52 is fixedly mounted on the shaft 24 substantially in the transverse vertical plane of the upper and lower pulleys. The cable 81 for lifting the bed 64 is attached at one end to the upper end of the supporting members 63, it being shown in Fig. 3 as being attached by means of a member 82 to the journal upon which the pulleys 58 and 59 are mounted. From the member 82 the cable extends downwardly at $a$ to the forward side of pulley 61, thence upwardly at $b$ to the rearward side of pulley 58, thence downwardly at $c$ to the forward side of pulley 62, thence upwardly at $d$ to the rearward side of the pulley 59, and thence downwardly at $e$ to the inner side of the drum 52, to which the other end of the cable is attached.

It will be understood that the bed 64 is pivotally mounted on the chassis to swing about a transverse axis at its rear lower edge, and from the above description it will be apparent that when the drum 52 is rotated in the direction indicated by the arrow in Fig. 3 the cable will be wound thereupon, and the bed will be swung upwardly about its rear transverse axis into the position shown in dotted lines in Fig. 2. Owing to the fact that the drum 52 is disposed almost directly beneath the pulley 59 the cable will be wound around the drum from end to end as the bed is being lifted.

When it is desired to actuate the dumping mechanism the clutch member 29 is shifted forwardly out of engagement with the clutch member 11 so that the clutch member 11 and all of the transmission mechanism disposed rearwardly of this member is disconnected from the engine. The clutch member 29 is then advanced into the position shown in Fig. 1, wherein the spur gear 27 is caused to mesh with the spur gear 26, the clutch member 29 being advanced into this position either at the same time as it is moved out of engagement with clutch member 11 or at a subsequent time.

By virtue of the division of the main line of shafting into a plurality of sections, and relating the various sections together substantially as shown in Fig. 1, a very flexible construction is afforded and at the same time very rugged construction is provided. By arranging the shaft 6 to move longitudinally with respect both to the shaft 3 and to the clutch member 11, still further flexibility is afforded. This longitudinal end-play taken in connection with the end-play permitted by the sliding connection between the shaft 14 and collar 15, especially with the universal joint 13, affords a construction particularly adapted for use in automobiles where the transmission line is subjected to extreme conditions of twisting and tortioning stress. By mounting the clutch member 11 in the ball-bearing 18 in such manner as to prevent longitudinal movement and in such manner as to provide centrally of the shafting a substantial bearing having little friction, the end-wise movement of the portions of the shafting disposed both forwardly and rearwardly of clutch member 11 is limited and the sectional shafting is simply and practically supported in the most advantageous manner. The thrust-bearing 48 overhanging the flange on coupling 12 serves the important function of preventing the coupling from being withdrawn from the clutch member 11 and at the same time preventing the escape of oil from the transmission housing 22, as more fully disclosed in my former application above referred to.

I claim:

1. A power-plant for auto-trucks and the like comprising a source of power, change-speed transmission gearing, shafting for connecting the source of power to the propelling wheels through said transmission gearing, a clutch-member for interrupting said shafting intermediate said transmission gearing and wheels, auxiliary transmission means, and coöperating gears on said shafting and auxiliary transmission means respectively for connecting and disconnecting the auxiliary transmission means to and from said shafting intermediate said gearing and said clutch-member, the gear on said shafting being arranged to be moved into and out of coöperative relationship with the other of said gears and being connected to said clutch-member so that the gears may be thrown into engagement when the clutch-member is moved into inoperative position.

2. In a power-plant for auto-trucks and the like comprising a source of power arranged to supply power to the propelling wheels through variable-speed transmission gearing and associated clutch, the combination of shafting for transmitting power from the gearing to the propelling wheels, a clutch-member disposed in said shafting for operatively dividing the shafting into two portions and thereby disconnecting the gearing from the wheels, auxiliary transmission means for transmitting power to auxiliary apparatus, and means for connecting and disconnecting the auxiliary transmission means to and from the said portion of shafting connected to the transmission gearing, whereby the auxiliary apparatus and propelling wheels may be supplied with power independently of each other, the last said means including a gear wheel non-rotatably associated with said clutch member.

3. In a power-plant for auto-trucks and the like, the combination of a power shaft, a connecting shaft, a driving shaft, the said shafts being collinearly arranged, means for connecting the power shaft to the connecting shaft so that the two shafts may move longitudinally but not angularly with relation to each other, a clutch member arranged to rotate with but to slide longitudinally of the driving shaft, and a second clutch member mounted to slide longitudinally of but to rotate with the connecting shaft, the two clutch members being arranged to be thrown into or out of power-transmitting engagement by sliding the second clutch member backwardly or forwardly along the connecting shaft.

4. In a power-plant for auto-trucks and the like, the combination of two collinear shafts, a circular member concentrically disposed between the shafts for operatively connecting the shafts together, each shaft having a portion telescoping with the circular member so as to permit longitudinal movement of the shafts relatively to the member, and a bearing for rotatably supporting the circular member, whereby both of said shafts are supported by said member and are permitted to move longitudinally.

5. In a power-plant for auto-trucks and the like, the combination of two collinear shafts, a circular member concentrically disposed between the shafts for operatively connecting the shafts together, each shaft having a portion telescoping with the circular member so as to permit limited longitudinal movement of the shafts relatively to the member, and a bearing for the circular member arranged to prevent endwise movement of the member, whereby both of said shafts are supported by said member and are permitted to move a limited amount longitudinally of the member.

6. In a power-plant for auto-trucks and the like, the combination of a power shaft, a connecting shaft, a driving shaft, universal-joint coupling means interposed between the connecting and driving shafts, all of said elements being collinearly arranged to move longitudinally of each other while constrained to rotate together, an auxiliary shaft, and means slidingly mounted on the connecting shaft for disconnecting the power shaft from the driving shaft and for connecting the power shaft to the auxiliary shaft.

7. In a power-plant for auto-trucks having tiltable beds, the combination of a pulley mounted on the free end of the tiltable bed in the region of the vertical, longitudinal central plane of the bed, a pulley mounted above said pulley, a main line of shafting for transmitting power from the engine to the propelling wheels, an auxiliary shaft disposed in parallelism with said main line of shafting, a drum mounted on said auxiliary shaft, a cable extending around said pulleys and drum in such manner that the bed is tilted when the cable is wound upon the drum, and means for connecting and disconnecting said auxiliary shaft from the main line of shafting.

8. In a power-plant for auto-trucks having tiltable beds, the combination of a source of power, change-speed transmission gearing of the planetary type, shafting for connecting the source of power to the propelling wheels through said planetary gearing, a clutch-member for interrupting said shafting intermediate said planetary gearing and said wheels, an auxiliary shaft disposed in parallelism with said shafting, a drum mounted on said auxiliary shaft, a pulley mounted on the free end of the tiltable bed, a pulley mounted on the truck above said pulley, a cable extending around said pulleys and drum so that the bed is tilted when the cable is wound upon the drum, and means for connecting and disconnecting the auxiliary shaft to and from said shafting intermediate said planetary gearing and said clutch-member.

Signed by me at Boston, Massachusetts, this 21st day of February, 1917.

CLARENCE J. HOGEBOOM.